INVENTOR.
WILLIAM H. HENLEY
BY R.E. Grangue
ATTORNEY

United States Patent Office 3,097,664
Patented July 16, 1963

3,097,664
FLUID FLOW REGULATOR
William H. Henley, Granada Hills, Calif., assignor to The Marquardt Corporation, Van Nuys, Calif., a corporation of California
Filed Dec. 15, 1960, Ser. No. 75,988
2 Claims. (Cl. 137—487)

This invention relates to a fluid flow regulator and more particularly to a device which regulates the flow of a fluid as a function of a single pneumatic input pressure.

Fluid flow regulators presently in use generally require more than one pressure sensitive device to position a valve for controlling fluid flow and to compensate for pressure drop across the valve. The device of the present invention controls the fluid flow with a single metering valve by utilizing a pneumatic computing network to determine the flow through the valve and to so position the valve that the flow equals that commanded by the single pneumatic input pressure. The means for continually computing fluid flow through the single metering valve controls a needle valve for varying the area of one of the orifices of a pressure divider receiving the single input pressure. The output signal of the pressure divider obtained intermediate the orifices thereof, is utilized to position the metering valve. The regulator of the present invention is compact and inexpensive to manufacture. The invention is particularly suitable for use as a fuel flow regulator for engines, such as turbojets and ram jets, since the air flow parameter for this type of engine generally appears in the form of a pneumatic pressure.

It is therefore an object of the present invention to provide a regulating device which regulates the flow of a fluid as a function of a single pneumatic input pressure.

Another object of the invention is to provide a fluid flow regulator which utilizes a single metering valve positioned so that the flow through the valve equals that commanded by a single pneumatic input pressure.

A further object of the invention is to provide a fluid flow regulator having sensing means for continually determining flow through a metering valve and having pressure divider means receiving a single pneumatic control pressure which is modified by said sensing means to produce an actuating pressure to move said metering valve.

These and other objects of the invention not specifically set forth above will become readily apparent from the accompanying description and drawings in which.

Figure 1:
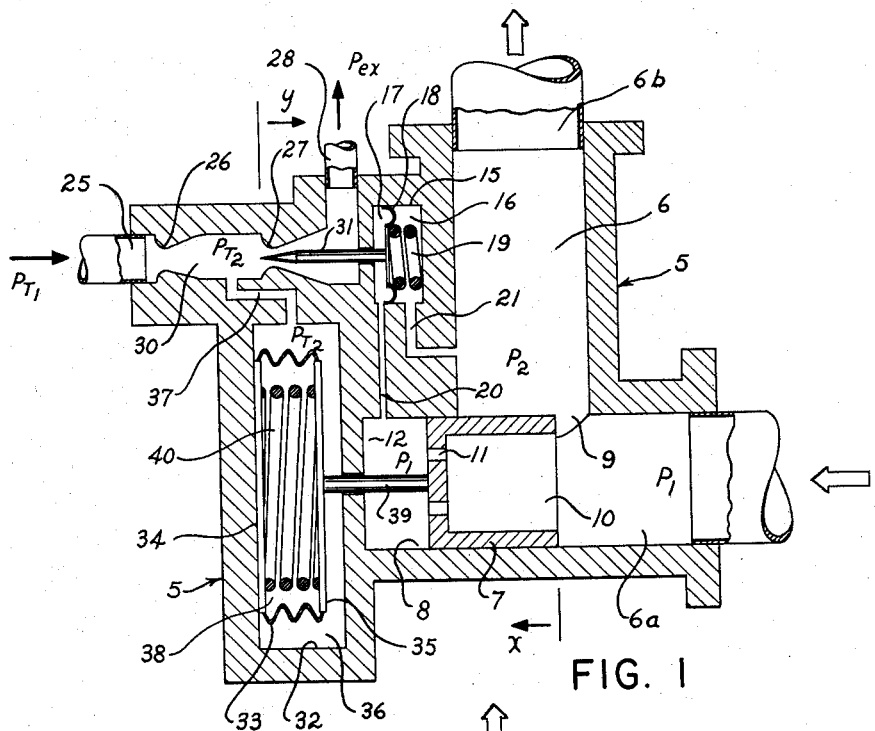
FIGURE 1 is a diagrammatic view of one form of the invention in which the output of the pressure divider acts against an evacuated bellows to control the metering valve.

The embodiment of the present invention chosen for illustration in FIGURE 1 comprises a casing 5 which contains a main fluid flow passage 6. A flow metering valve 7 is positioned between an upstream section 6a and a downstream section 6b of the passage in order to control the flow through the passage. These passage sections are at right angles to each other and the cup-shaped valve 7 is slidable in an opening 8 in the casing to vary the flow area 9. The hollow interior 10 of the valve and openings 11 in the base of the valve communicate the upstream pressure $P_1$ to the space 12 on the other side of the valve. The casing 5 contains a compartment 15 which is divided into spaces 16 and 17 by a diaphragm 18 and the diaphragm is biased by a spring 19. Passage 20 communicates the pressure $P_1$ from space 12 to space 17 while passage 21 communicates the pressure $P_2$ in downstream passage section 6b to the space 16.

The casing 5 also contains a passage 25 connecting with the pneumatic input pressure $P_{T_1}$, and the passage 25 contains an upstream orifice 26 of area $A_{26}$ and a downstream orifice 27 of area $A_{27}$. A passage 28 connects the discharge side of orifice 27 to an exhaust pressure $P_{ex}$ which is sufficiently lower than pressure $P_{T_1}$ to cause sonic velocity flow at the throats of orifices 26 and 27. The orifices 26 and 27 form the two orifices of a pressure divider such as disclosed in U.S. Patent Re. 24,410 granted December 31, 1957, to John A. Drake and thus, the pressure $P_{T_2}$ in space 30 intermediate the two orifices is a function of the pressure $P_{T_1}$ and the ratio of the area of orifice 26 to the area of orifice 27. A needle valve 31 is connected with diaphragm 18 and extends into orifice 27 to vary the throat area thereof in response to movement of the diaphragm and it is apparent that such variation in area will effect the output pressure $P_{T_2}$ in space 30.

Chamber 32 in casing 5 contains an evacuated bellows 33 which is closed at one end by plate 34 secured to the casing. A movable plate 35 closes the other end of the bellows and separates space 36 from the evacuated space 38 within the bellows. The movable plate 35 is connected by a shaft 39 to the valve 7 and a spring 40 is contained within the evacuated space to act against the pressure $P_{T_2}$ in space 36.

The operation of the regulator of the present invention depends upon two basic relations, namely (a) the equation of turbulent flow through the orifice 9 and (b) the pressure divider equation governing the pressure $P_{T_2}$. The fluid flow through orifice 9 is represented as follows:

(1) $$W_f = A_9 C \sqrt{P_1 - P_2}$$

where $A_9$ is the area of orifice 9, C is a constant and $P_1$ and $P_2$ are the upstream and downstream pressure, respectively, in passage 6. The fluid pressure drop $$(P_1 - P_2)$$

across the metering valve 7 is applied across the spring loaded diaphragm 18 so that the needle valve 31 experiences a deflection "$y$" proportional to this pressure difference. The needle 31 and the orifice 27 are so contoured that movement of the needle valve varies the throat area of the orifice proportionally to the square root of the displacement "$y$" and of the pressure drop $(P_1 - P_2)$. This relation can be written:

(2) $$A_{27} = K_2 \sqrt{P_1 - P_2}$$

where $K_2$ is a constant

The pressure divider equation governing the output pressure $P_{T_2}$ is as follows:

(3) $$P_{T_1} = \frac{A_{26} K_1 P_{T_1}}{A_{27}}$$

where $K_1$ is a constant

Substituting the relationship 2, the pressure $P_{T_2}$ can be represented as follows:

(4) $$P_{T_1} = \frac{K_1 A_{26} P_{T_1}}{K_2 \sqrt{P_1 - P_2}}$$

The output pressure $P_{T_2}$ of the pressure divider is applied through passage 37 to the space 36 so that the metering valve 7 is deflected a distance "$x$" from its closed position proportional to the magnitude of the pressure $P_{T_2}$.

In other words (5) $$X = K_3 P_{T_2}$$

where $K_3$ is a constant.

Also, the metering valve flow area $A_9$ is made proportional to the displacement "$x$" so that the expression for the flow area can be written (6) $$A_9 = K_4 P_{T_2}$$

where $K_4$ is a constant.

Combining Equations 4 and 6, the following relationship results:

(7) $$\frac{A_9}{K_4} = \frac{K_1 A_{26}}{K_2 \sqrt{P_1 - P_2}} P_{T_1}$$

Rearranging this equation:

(8) $$A_9 \sqrt{P_1 - P_2} = \frac{K_1 K_4 A_{26}}{K_2} P_{T_1}$$

Finally, combining Equation 8 and Equation 1, the governing equation of the device can be seen to be:

(9) $$W_f = \left( \frac{K_1 K_4 A_{26} C}{K_2} \right) P_{T_1}$$

It is therefore apparent that the fluid flow through passage 6 is maintained directly proportional to the pneumatic input pressure $P_{T_1}$ and that it is unnecessary to have more than a single control pressure to operate the regulator.

Figure 2:
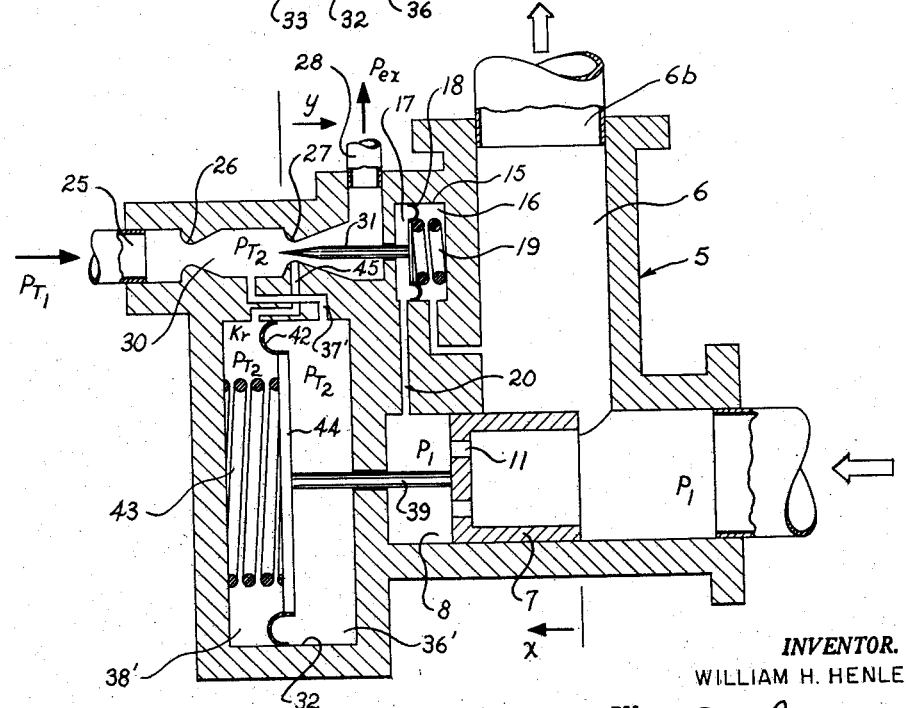
FIGURE 2 is a second form of the invention in which the output of the pressure divider acts against a second pressure proportional to the output pressure to control the metering valve.

Referring to FIGURE 2, wherein like reference numerals designate like parts, this form of the invention differs from that of FIGURE 1 only in the actuator structure for positioning the metering valve 7. In this modification, compartment 32 is divided into spaces 36' and 38' by a diaphragm 42 and a spring 43 is located in space 38' between the diaphragm plate 44 and the side of the compartment. The plate 44 is connected to the valve 7 by a shaft 39. A passage 37' connects the pressure $P_{T_2}$ with the space 36' and a passage 45 connects the pressure at the sonic throat of orifice 27 with the space 38'. Otherwise, all other structures of FIGURE 2 are the same as in FIGURE 1. Since the pressure at the sonic throat of orifice 27 has a fixed ratio $K_R$ to the pressure $P_{T_2}$, the displacement of the valve 7 of FIGURE 2 will be proportional to the pressure $P_{T_2}$ as in the prior embodiment. The pressure $P_{T_2}$ is supplied to space 36' on one side of diaphragm 42 having an effective area $A_d$, and the pressure $K_R P_{T_2}$ is supplied to space 38' on the other side. Thus, the diaphragm produces a force equal to

(10) $$P_{T_2}(1 - K_R) A_d$$

This force applied against a spring rate R of spring 43 results in a displacement

(11) $$X = P_{T_2} \frac{(1 - K_R)}{R} A_d$$

The above can be rewritten as

(12) $$X = K_5 P_{T_2}$$

which is identical in form to the relationship for the evacuated bellows of the prior embodiment. It is therefore apparent that the regulator of FIGURE 2 will operate in the same manner as the regulator of FIGURE 1 to produce a fluid flow through passage 6 which is a function of the input pressure $P_{T_1}$.

The present invention can meter both liquid and gaseous fluids and the input pressure $P_{T_1}$ can be derived from a liquid or a gas. While the description refers to a pressure divider having sonic flow of a compressible fluid at its orifice throats satisfactory results can be obtained with sub-sonic throat velocities at the orifices and with liquids flowing through the orifices since in these cases, the pressure in chamber 30 varies approximately with the area of orifice 27.

The diaphragm 18 in both forms of the invention could be replaced by one or more bellows or similar devices to allow higher pressure levels and more reactive fluids to be used, and to facilitate sealing between air and fluid. Also, a non-linear relationship between the input pressure $P_{T_1}$ and the fluid flow $W_f$ can be obtained by providing a non-linear variation of metering area of orifice 9 with displacement "$x$." While the needle valve 31 varies the second orifice 27 of the pressure divider, the area of the upstream orifice 26 could be varied instead to obtain the same result. Also, one area of the pressure divider can be varied by the needle 31 and the other orifice area can be changed as a function of a second variable so that the fluid flow $W_f$ would be a function of the input pressure $P_{T_1}$ and of the second variable. Various other modifications are contemplated by those skilled in the art without departing from the spirit and scope of the invention as hereinafter defined by the appended claims.

What is claimed:

1. A fluid flow regulator comprising a fluid flow passage, a movable valve for controlling the amount of fluid flow through said passage, means for sensing the instantaneous fluid flow through said passage, an input pressure for controlling fluid flow, pressure divider means having an upstream orifice connected with said input pressure and having a downstream orifice and a pressure chamber therebetween, means responsive to said sensing means for varying the area of one of said orifices to produce a pressure in said chamber proportional to said input pressure, and means responsive to said proportional pressure for positioning said valve to maintain said fluid flow proportional to said input pressure, said orifice varying means comprising a needle valve connected with said sensing means, said one variable orifice and said needle valve being contoured to vary the area of said one orifice in proportion to the square root of the fluid flow.

2. A fluid flow regulator as defined in claim 1, wherein movement of said flow controlling valves produces a valve area opening proportional to displacement of said valve.

References Cited in the file of this patent
UNITED STATES PATENTS

| | | |
|---|---|---|
| Re. 24,410 | Drake | Dec. 31, 1957 |
| 2,399,938 | Pett | May 7, 1946 |
| 2,919,711 | Lord | Jan. 5, 1960 |